United States Patent
Bauer et al.

[11] Patent Number: 5,908,220
[45] Date of Patent: Jun. 1, 1999

[54] SEAT AREA OF A MOTOR VEHICLE CUSHION ADJUSTABLE IN ITS INCLINE

[75] Inventors: Heinz Bauer; Burckhard Becker; Ernst-Reiner Frohnhaus, all of Solingen, Germany

[73] Assignee: C. Rob. Hammerstein GmbH & Co. KG, Solingen, Germany

[21] Appl. No.: 08/898,198

[22] Filed: Jul. 22, 1997

[30] Foreign Application Priority Data

Jul. 22, 1996 [DE] Germany .................. 196 29 440

[51] Int. Cl.$^6$ .................................................. A47C 3/025
[52] U.S. Cl. ................................. 297/284.14; 297/313
[58] Field of Search ........................... 297/312, 284.11, 297/284.1, 284.3, 313; 248/394

[56] References Cited

U.S. PATENT DOCUMENTS

| | | | |
|---|---|---|---|
| 4,491,365 | 1/1985 | Murkami | 297/284.11 |
| 4,589,696 | 5/1986 | Kanai et al. | 297/284.11 |
| 4,753,479 | 6/1988 | Hatsutta et al. | 297/284.11 |
| 5,697,672 | 12/1997 | Mitchell | 297/284.11 |

Primary Examiner—Peter M. Cuomo
Assistant Examiner—Anthony D. Barfield

[57] ABSTRACT

The invention relates to a seat area of a motor vehicle seat with a seat cushion adjustable in its incline by height adjustment of the front edge of the seat consisting of a seat support, a pillow spring system and an upholstery part, the seat support comprising a support unit and a swivelling bridge which among others defines the front edge of the seat. Between the swivelling bridge and the support unit and a swivelling bridge which among others defines the front edge of the seat. Between the swivelling bridge and the support unit an adjustment regulation device is planned for an incline adjustment of the swivelling bridge opposite the support unit. A rear support unit, with which the swivelling bridge is connected on both ends via joints is allocated to the swivelling bridge by formation of a cushion support, which can be upholstered. Between the part of the swivelling bridge which is forming the front part of the seat and the rear support unit the pillow spring system is bent. At the swivelling bridge and the rear support unit, mounting parts are planned which work together, and which limit a folding together of the swivelling bridge and the rear support unit around the joints positioned along the side and by the effect of the pillow spring system to a predetermined angle.

10 Claims, 1 Drawing Sheet

SEAT AREA OF A MOTOR VEHICLE CUSHION ADJUSTABLE IN ITS INCLINE

BACKGROUND OF THE INVENTION

1. Field of the Invention

The invention relates to a seat area of a motor vehicle seat with a seat cushion adjustable in its incline by height adjustment of the front edge of the seat consisting of a seat support, a pillow spring system and an upholstery part, the seat support showing a support unit and a swivelling bridge, which among others defines the front edge of the seat. Between the swivelling bridge and the support unit an adjustment regulation device is planned for an incline adjustment of the swivelling bridge opposite the support unit.

2. Description of the Prior Art

Such a seat area of a motor vehicle seat is known from DE 36 24 398 C2. With such known motor vehicle seat the support unit has mainly a frame-shape. The swivelling bridge is joined to it, the swivelling bridge is placed above the front parts of the support unit. The seat cushion can be fitted to the support unit. The support unit itself is supported by a bottom rest, for example via front or back parallelogram levers a device for height adjustment or directly at the seat rails of longitudinal adjustment devices.

With the seat areas of a motor vehicle seat already known attachment of an upholstery part is time-consuming. In production the motor vehicle seat must be initially produced mainly mechanically, only after that the upholstery part can be attached to it. For the production process this is disadvantageous.

Here the invention sets in. It is the task of the invention to further develop and modify the seat area of the known motor vehicle seat by keeping possibly all its advantages so that the seat upholstery can be finished at an early stage of the production process of the motor vehicle seat and can also be fitted into the motor vehicle seat at any given time of the production procedure.

SUMMARY OF THE INVENTION

Departing from the seat area of a motor vehicle seat of the above mentioned kind, this task is solved by the fact, that by formation of a cushion support that can be upholstered, the swiveling bridge is allocated to a rear support unit, with which the swivelling bridge is connected on both ends via joints and that between the part of the swivelling bridge which is forming the front edge of the seat and the rear support unit, the pillow spring system is bent, and that the swivelling bridge and the rear support unit, mounting parts are planned which work together, and which limit a folding together of the swivelling bridge and the rear support unit around the joints and by the effect of the pillow spring system to a predetermined angle.

According to the invention a cushion support, separated from the support unit is planned, which is constructed of the already known swivelling bridge and an additional rear support unit. Between these two, the pillow spring system is bent. Swivelling bridge and rear support unit are connected with each other at both ends of the seat via planned joints. Because of the effect of the seat spring system both parts of the cushion support, namely swivelling bridge and rear support unit, are flexibly prestressed in such a way that they fold together at the axis of their joints. The mounting devices, however, prevent the swivelling bridge and the rear support unit to fold together too strongly. They are much rather kept in a position, in which they are positioned towards each other in a predetermined angle. This predetermined angle preferably corresponds to the maximum height position of the front part of the seat when the motor vehicle seat is readily produced.

According to the invention a cushion support that can be upholstered is proposed, which is initially completely upholstered during the production of the motor vehicle seat, namely attached with the upholstery part, and only later connected with the support unit of the seat support at a suitable point in time. Hereby the rear support unit can partly take over some of the tasks which are to be fulfilled by the support unit, for example to form a partial area of the seat support when the motor vehicle seat is in the state of being completely built, namely a part of the rear part. The rear support unit shows bore holes for its attachment to the support part of the seat support.

In a preferred embodiment the swivelling bridge shows a basis, which determines the front edge of the motor vehicle seat, and two side legs, where the connection with the rear support unit and via the two joints occurs. The two mounting parts allocated to the swivelling bridge are also preferably positioned at these side legs.

Furthermore it is advantageous to construct the rear support unit also in a U-shape from a basic area and two side legs, whereby the join connection with the swivelling bridge can occur at the side legs and furthermore the corresponding mounting parts can also be formed there in a preferred embodiment.

The formation of the mounting parts can occur at random between the rear support unit and the swivelling bridge, in a preferred embodiment the mounting parts are only used during the production of the motor vehicle seat and not at a later stage. As the formation of the mounting parts can be performed in a very simple fashion, it is sufficient to form a bend at the legs of the swivelling bridge, which is positioned in the movement area of the side legs of the rear support unit, preferably the mounting parts are planned permanently and are not to be removed during the production process of the motor vehicle seat, which is also possible though, if desired.

The cushion support consisting of the swivelling bridge and the rear support unit is designed and produced in such a way that it can easily be upholstered on one hand and on the other it can be easily connected with the support unit of the seat support. It has proven to be advantageous for the attachment of the upholstery part, if the rear support unit and/or the swivelling bridge show areas, which run in the vertical direction, and which stand upright and around which the upholstery material or at least a cover or protection, for example the upholstery material, can be pulled.

The support unit of the seat support, onto which the cushion support is fitted with the upholstery part, is preferably positioned within the cushion support, in such a way that the support unit is covered. It is advantageous to have a snap-on connection between the upholstered cushion support and the support unit, it is achieved by pressing the upholstered cushion support onto the support unit, whereby elastic tongues slide along the support unit and grip into it as soon as the cushion support was pressed into the necessary depth. Other ways of attachment are hereby not excluded.

In a preferred embodiment the axis of the joints is positioned at a place, which shows a further distance to the front edge of the seat than from the basic area of the support unit. Thereby the axis of the joints is positioned behind the centre of the seat cushion seen from the direction of the depth of the seat.

It proves to be especially advantageous to arrange the pillow spring system in such a way that it always runs above the axis of the joints, namely that both parts of the cushion support aim at folding together at the top. That way the allocation for the adjustment regulation device for the incline adjustment is given, which should be in the top regulation position for assembling. This does not exclude that both parts of the upholstered cushion support are held together by the mounting parts in another configuration, which for example correspond to the lowest regulation of the front edge of the seat and that the mounting parts are released at a later stage.

Further advantages and characteristics of the invention result from the respective claims and the following illustration of a non restrictive embodiment of the invention, which will be explained with reference to the accompanying drawing. The drawing shows in:

BRIEF DESCRIPTION OF THE PREFERRED DRAWINGS

FIG. 1: a perspective illustration of a seat area of a motor vehicle seat which has not yet been upholstered, a seat support is shown with a cushion support that can be upholstered, the height of the front edge of the seat can be regulated via an adjustment regulation, FIG. 2: an illustration according to FIG. 1 of a cushion support in another embodiment and FIG. 3: an illustration according to FIG. 1 of a cushion support in another modified embodiment.

First of all the embodiment according to FIG. 1 will be discussed, the following embodiments according to FIGS. 2 and 3 will be discussed at a later stage, whereby the characteristics already shown in the first embodiment, and which are also shown in the embodiments according to FIGS. two and three, are not mentioned again, but attention is merely drawn to the differences between them.

DESCRIPTION OF THE PREFERRED EMBODIMENTS

Figure 1:
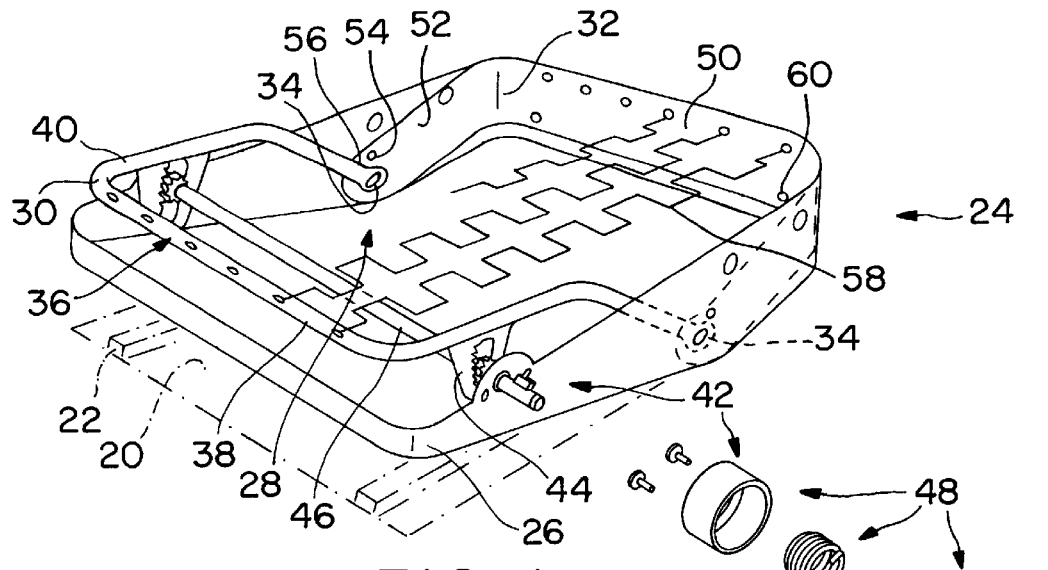

FIG. 1 shows the seat area of a motor vehicle seat, which is not upholstered. On a bottom rest 20 known already and two longitudinal guides 22 a seat support 24 is arranged. It shows a support unit 26, which has a frame-shape and which is connected with the two seat rails of the two longitudinal guides 22. The support unit 26 itself picks up a cushion support 28, which can be upholstered and shows a swivelling bridge 30 as well as a rear support unit 32. Swivelling bridge 30 and a rear support unit 32 are in a swinging way connected via side joint 34. As can be seen from FIG. 1, these two joints are positioned on one axis, which runs parallel to a front edge of a seat 36 and which is positioned in a distance of about 50 to 70% of the total depth of the seat support 24 from this front edge of the seat 36. This front edge of the seat 36 is mainly formed by a basis 38 of the swivelling bridge 30 which has a U-shape. Attached to this basis there are legs 40, which run sideways and across to it. The joints 34 are formed each at its rear, loose ends. Near the front edge of the seat 36 they are connected with an adjustment element of an adjustment regulation device 42 for the height of the front edge of the seat 36 opposite the support part 26. In this particular case there are gearing parts 44, whose teeth are arranged on an arc of a circle around the axis of the joints 34. Both gearing parts of the two legs 40 are in gear with pinions, which are arranged on a shaft 46, which is pivoted in the support unit 26. The shaft 46 is allocated to a device 48 for turning and adjustment regulation, for example a wobble gearing or a similar device can be planned here. The particular embodiment shows a device 48 with a wrap spring.

The rear support unit 32 also consists of a basic area 50, which essentially defines the back edge of the seat support 24, and two side legs 52, so that it essentially shows a U-shape. The two loose ends at the front of the side legs 52 are formed at parts of the joints 34. Bolt-shaped mounting parts 54 are also positioned there, which in their highest position, which is possible within the regulation way of the adjustment regulation device 42 for the front edge of the seat 36, stop at the upper edge of the legs 40. The area in which this stop takes place is called the stop part 56 of the swivelling bridge 30. The basic area 50 of the rear support part 42 and the basis 38 of the swivelling bridge 30 are connected with each other via springs 58 of a pillow spring system, these springs 58 act as tension springs in their longitudinal direction.

The mounting parts 54 and 56 prevent that the cushion support 28, which is not yet integrated into the support unit 26, does not fold together due to the effect of the tension of the springs 58 around the axis of the joints 34 in one direction, and in the embodiment according to FIG. 1, to the top. The mounting pars 54, 56 are arranged in such a way that the position of the angle of the swivelling bridge 30 and the rear support unit 26 is in one position, which corresponds to a given position of the adjustment regulation device 42, in the embodiment shown according to FIG. 1 the highest position of this adjustment regulation 42. In the embodiment according to FIG. 1 the mounting parts 54 are permanently formed, but they can also be removed, for example formed as put-on pins, which are kept in their position based on the effect of the springs 58 and which are only used in the support unit 26 until the cushion support 28 is assembled. After the assembling they can be removed.

The support unit 26 does not necessarily show a frame-shape. As can be seen from FIG. 1, rear support part 32 and support unit 26 run next to the other for the most part. To save weight and with sufficient stability of the rear support part 32 it would be sufficient, if the support unit 26 is merely U-shaped and connected with the side legs 52 of the rear support part 32. That way it is possible to exclude the rear area parallel to the rear edge of the seat support 24 and a rear partial area of each side of the support unit 26.

Support unit 26 and rear support part 32 are connected with each other, in the embodiment shown this connection is realized via a rivet 60, but any other mode of connection is possible. It is also possible to have protrude the axis of both joints 34 sideways to the exterior, so that they fit into the corresponding bore holes of the support unit 26 and that way a fitting occurs.

Swivelling bridge 30 and rear support part 32 are formed in such a way, that can be completely upholstered before fitting them into the support unit 26, which is essentially constructed by them. This can also be seen from two of the other embodiments.

Figure 2:
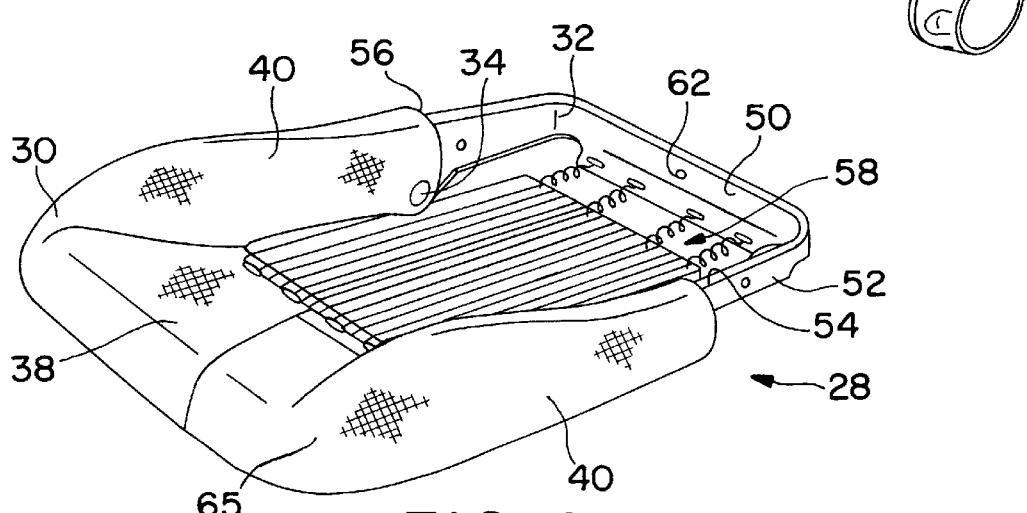

According to FIG. 2 the swivelling bridge of a seat having upholstering 65 is constructed from an essentially wider and in its design in the latter seat area, essentially closer basis 38, on which the springs 58 engage, and also constricted with wider and correspondingly formed legs 40 in comparison to the former embodiment. Seen from the diameter, the latter show a U-profile, which is open to the bottom and grip the loose ends of the side legs 52 of the rear support unit 32. The mounting parts 54, 56 are formed on one hand via the upper interior edge of the U-basis of the loose end of each leg 40 and on the other end the upper edge of the side legs 52 near the loose ends of the former. In the rear support unit 32 holes 62 are designed, they can be planned for rivets or other fitting devices, with which the rear support unit 32 is fitted to the support unit 26.

Figure 3:
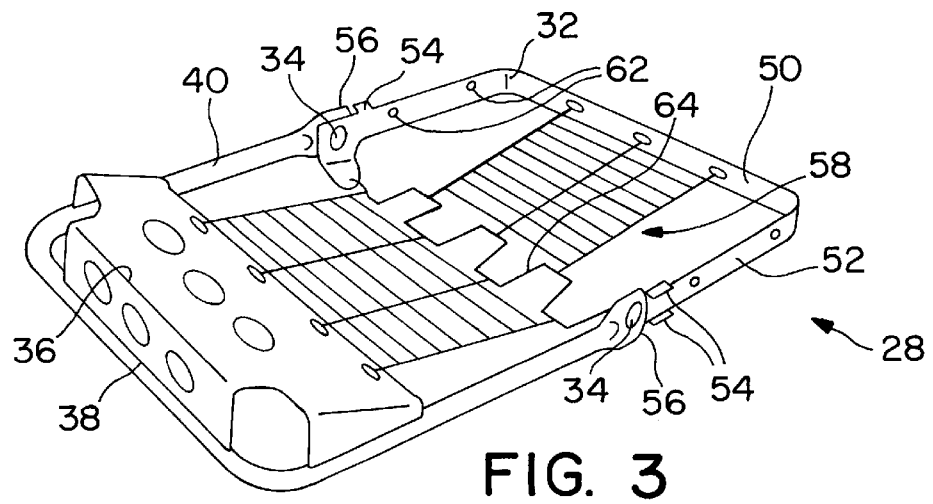

In the embodiment according to FIG. 3, per each joint 34 an upper and a lower rag is planned, which is bent towards the exterior from the level of the side legs 52 as mounting parts 54 of the rear support unit 32. Both operate in combination with the front part of the final areas of the legs 40 of the swivelling bridge 30. Here, two mounting pieces are therefore designed, which limit both swivelling directions of the swivelling bridge 30 opposite the rear support unit 32, and in such a way that there is a swivelling movement in either one or the other swivelling direction.

In the embodiment according to FIG. 3, on one hand the swivelling bridge 30 is constituted of an essentially U-shaped component, which is made from a tube, has a U-shape and has been pressed flat for the formation of the areas of the joints 34, and on the other hand of a more or less desk-shape construction, where springs 58 grip. This construction is put on the U-shape tube.

A particularity of this embodiment according to FIG. 3 can be found in a support device 64 running laterally, which is formed by a spring, which itself starts at projections, which are planned to be positioned at the loose ends of the side legs 52 and which protrude towards the inside. This spring is positioned in the course of the pillow spring system 58 and has the effect that a regulation of the height adjustment of the cushion, which is essentially positioned above the cushion support 58 after production, is prevented. The support device 64 can also be constructed of non-spring connection means. In a preferred embodiment it runs near the axis, on which both joints 34 are positioned.

What is claimed is:

1. A motor vehicle seat having a front part, a front edge, and a side, said seat is adjustable in its incline by height adjustment of the front edge of the seat, said seat comprising a seat support, a pillow spring means and a cushion part, said seat support comprising a support means and a swivelling bridge which defines the front part of said seat, including an adjustment regulation means between the swivelling bridge and the support means for an incline adjustment of said swivelling bridge opposite the support means, a rear support unit with which the swivelling bridge is rotatably connected on both ends of said rear support unit via joints associated with said swivelling bridge thereby forming a cushion support which can be upholstered, and between the front part of said seat and the rear support unit, a means for limiting folding together of the swivelling bridge and said rear support unit around the joints to a predetermined angle are positioned along sides of the cushion support.

2. A motor vehicle seat according to claim 1, including a adjustment regulation device and wherein said predetermined angle is chosen so that the front edge of the motor vehicle seat assumes its highest possible position within a regulation area of the adjustment regulation device.

3. A motor vehicle seat according to claim 2, wherein said swivelling bridge is connected with a part of the adjustment regulation device for the incline adjustment.

4. A motor vehicle seat according to claim 1, wherein said swivelling bridge shows a basis forming the front edge of the seat and two side legs and an axis of the joints runs parallel to the basis.

5. A motor vehicle seat according to claim 1, wherein said rear support unit shows one basic part and two side legs.

6. A motor vehicle seat according to claim 1, including mounting parts near said joints.

7. A motor vehicle seat according to claim 1, wherein said cushion support has a laterally running spring which co-operates with said pillow spring means.

8. A motor vehicle seat according to claim 1, wherein the rear support unit comprises one basic part and two side legs, and the swivelling bridge comprises a basis forming the front edge of the seat and two side legs, and further comprising mounting parts planned at the side legs of the swivelling bridge and at the side legs of the rear support unit.

9. A motor vehicle seat according to claim 1, wherein the rear support unit comprises one basic part and two side legs, and the swivelling bridge comprises a basis forming the front edge of the seat and two side legs and is connected to said rear support unit by the joints positioned along one axis, further comprising mounting parts planned at the legs of the swivelling bridge and at the side legs of the rear support unit, and where the axis of the joints is arranged at a distance of about 50 to 70% of a total distance of the seat support from the front edge of the seat.

10. A motor vehicle seat according to claim 9, including a pillow spring system which runs above the axis of the joints and the pillow spring system when stressed by the weight of a passenger, will stay above said axis.

* * * * *